Dec. 30, 1969  H. R. RICHARDSON ET AL  3,486,266

FISHING LINE

Filed July 5, 1968

INVENTORS
HAL R. RICHARDSON
BY ARTHUR M. HOWALD

Marshall & Yeasting
Attorneys

United States Patent Office 3,486,266
Patented Dec. 30, 1969

3,486,266
FISHING LINE
Hal R. Richardson, Columbia, S.C., and Arthur M. Howald, Perrysburg, Ohio, assignors to Soo Valley Company, Columbia, S.C., a corporation of South Carolina
Filed July 5, 1968, Ser. No. 742,848
Int. Cl. A01k 91/00
U.S. Cl. 43—44.98                                    6 Claims

ABSTRACT OF THE DISCLOSURE

A fishing line comprising a filamentous core, surrounded by a flexible surface layer which consists essentially of plasticized polyvinyl chloride having microscopic glass beads dispersed therethrough to improve the physical properties and increase the specific gravity of the line.

BACKGROUND OF THE INVENTION

This invention relates to a fishing line which has excellent physical properties even when made with a very small diameter, and which can be produced with an exceptionally high specific gravity that makes it particularly well-suited for use as a sinking fishing line.

It has been common practice to produce fishing lines that consist of a filamentous core surrounded by a flexible surface layer of plasticized polyvinyl chloride. The first step in producing such a fishing line consists in coating a core made of a filamentous material, such as braided nylon, with a surface layer consisting of a polyvinyl chloride plastisol. A polyvinyl chloride plastisol is a viscous liquid that consists essentially of a suspension of finely divided polyvinyl chloride in a liquid phase that is made up of one or more plasticizers. The final step in the manufacture of such a line consists in heating to a temperature of about 350–380° F. When a polyvinyl chloride plastisol is heated to such a temperature, the polymer fuses and goes into solution in the plasticizer phase. The resulting solution of the polymer in the plasticizer, upon cooling, is no longer a liquid, but is a solid which forms a flexible surface layer surrounding the filamentous core.

Such a fishing line, consisting of a filamentous core surrounded by a flexible surface layer of plasticized polyvinyl chloride, has excellent strength and durability. However, such a fishing line has tended to be too flexible to give satisfactory results in casting. In order to have the desired action in casting, a fishing line must be sufficiently stiff so that it tends to straighten out rather than to form loops or coils which would produce knots or tangles.

Also, a fishing line consisting of a filamentous core surrounded by a flexible surface layer of plasticized polyvinyl chloride is too buoyant to be used as a sinking line for applications in which it is not desired that the line float upon the surface of the water. The buoyancy of such a line is due to the fact that the specific gravity of plasticized polyvinyl chloride is between about 1.2 and 1.3, and to the fact that the braided nylon core which is usually employed in such a line is substantially hollow and thus contributes to the buoyancy of the line. Attempts have been made to reduce the buoyancy of such a line by using lead wire in the core, but it has been found that the buoyancy of such a line cannot be reduced appreciably by using lead wire in the core without rendering the line excessively brittle.

SUMMARY OF THE INVENTION

The principal object of the invention is to provide a fishing line having excellent physical properties which can be produced with an exceptionally high specific gravity. More specific objects and advantages are apparent from the following detailed description, which is intended to disclose and illustrate but not to limit the invention.

The present invention is based upon the discovery that a fishing line which has an excellent degree of stiffness, which has high strength and durability, which runs through the guides of a fishing rod with unusually little friction, and which can be produced with an exceptionally high specific gravity is obtained by the use of microscopic glass beads dispersed throughout a surface layer which consists essentially of plasticized polyvinyl chloride and which surrounds a filamentous core.

It has been discovered that an amount of glass beads, dispersed throughout the plasticized polyvinyl chloride surface layer, which is sufficient to increase substantially the density of the fishing line does not impair the physical properties of the line but instead enhances the physical properties, and causes the line to slide through the guides of a fishing rod with a remarkably low degree of friction.

A fishing line embodying the present invention is exceptional in that it can be made relatively small in diameter and still possess sufficient strength, stiffness and specific gravity to give excellent results.

A fishing line embodying the present invention may have a high specific gravity, and therefore may be made small in diameter, so as to minimize the friction which is created when the line slides through the guides of a fishing rod, while still possessing remarkably high weight per unit of length and adequate stiffness, so that the line has excellent action in casting. In fact, the use of microscopic glass beads of varied density, dispersed throughout the surface layer of plasticized polyvinyl chloride, makes it possible to vary the weight of the line almost at will, so that in the practice of the invention it is possible to manufacture a series of lines each having a different weight per unit of length, but all having the same small diameter. In practice, it is necessary to provide lines having a different weight per unit of length, because different rods require lines of different weight in order to give satisfactory casting action.

The particular filamentous core that is selected for use in manufacturing a fishing line has a certain fixed diameter. Also, the surface layer of plasticized polyvinyl chloride must have a certain minimum thickness in order that the fishing line may have satisfactory properties. Thus, the minimum diameter of a fishing line consisting of a filamentous core surrounded by a flexible layer of plasticized polyvinyl chloride which is attainable in practice is about .040 inch. However, the lines of such small diameter which have been produced heretofore have been of such small weight that they could not be cast satisfactorily with most rods. Also such lines have been excessively flexible.

Heretofore, in order to produce fishing lines of various weights per unit of length, as required for use with rods of various types, it has been necessary to use a different thickness of surface layer for each desired weight per unit of length. Thus lines of low weight per unit of length have been made of minimum thickness, and lines of relatively high weight per unit of length have consisted of a relatively thick surface layer of plasticized polyvinyl chloride surrounding the filamentous core. Also, a conventional braided nylon core having a diameter of .025 inch, which is customarily used in order to produce a line having a breaking strength of 15 lbs., is substantially tubular so that such a core, if provided with a plasticized polyvinyl chloride surface layer having a thickness of only .01 inch, would produce a line whose specific gravity would be too low to permit the line to be used as a sinking fishing line.

Thus, it has been necessary heretofore that a line consisting of a filamentous core surrounded by a surface layer of plasticized polyvinyl chloride have a relatively large diameter in many cases, either to provide sufficient weight per unit of length to permit the line to be cast with a given rod, or to provide a specific gravity to permit the line to be used as a sinking fishing line.

The relatively large diameters which have been necessary in many such fishing lines heretofore have had several serious disadvantages.

In the case of a sinking fishing line, the force tending to cause the line to sink is equal to the weight of the line minus the total weight of the volume of water that is displaced by the line. Moreover, even the lines which have consisted of a relatively thick surface layer of plasticized polyvinyl chloride surrounding a braided nylon core have had a specific gravity of only about 1.25, approaching the specific gravity of the plasticized polyvinyl chloride. In the case of such a fishing line, having a specific gravity of 1.25, the force tending to cause the line to sink in water is only 20% of the weight of the line. In contrast, the specific gravity of a typical sinking fishing line embodying the present invention is 1.85. The force tending to cause sinking of the present line, having a specific gravity of 1.85, is more than twice the force tending to cause sinking of a prior line which has the same weight per unit of length and which has a specific gravity of 1.25. Of course, the present line, having a higher specific gravity, is substantially smaller in diameter than a prior line which has the same weight per unit of length.

The relatively small diameter of a sinking fishing line embodying the invention is advantageous also in that it reduces the resistance offered by the water to the sinking movement of the line. Thus a sinking line embodying the invention will sink faster than prior lines not only because of the greater force tending to cause sinking of a line which has a given weight per unit of length, but also because of the lesser resistance of the water to the sinking movement of the present line.

A fishing line embodying the present invention, because it is generally smaller in diameter than any prior line which has the same weight per unit of length, is easier to reel in or cast when it is wet because the present line tends to carry less water because of its smaller diameter and smaller total surface area.

Another advantage of the relatively small diameter of the present line is that the present line offers less wind resistance in casting.

One of the most important advantages of the present line is that it runs through the guides of a fishing rod with substantially less friction than prior lines. This reduction in friction is due in part to the smaller diameter of the present line. However, it has been discovered also that the presence of the microscopic glass beads in the present line substantially decreases the frictional resistance which is offered when the line slides through the guides, even when a line embodying the present invention is compared to a prior line of the same diameter consisting of a filamentous core surrounded by a layer of plasticized polyvinyl chloride.

DESCRIPTION OF THE PREFERRED EMBODIMENTS

Figure 1:
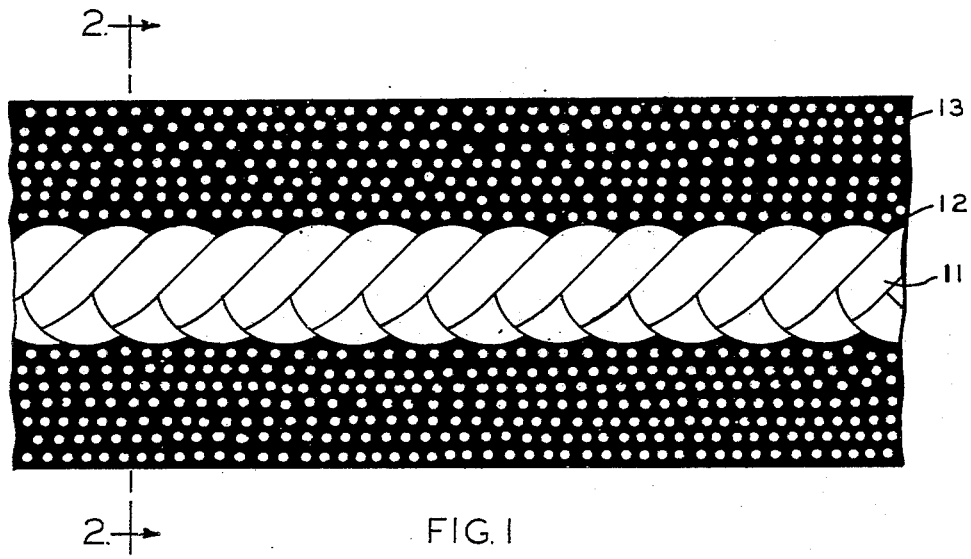
FIG. 1 of the drawing is a longitudinal section, on an enlarged scale, of a fishing line embodying the invention.
Figure 2:
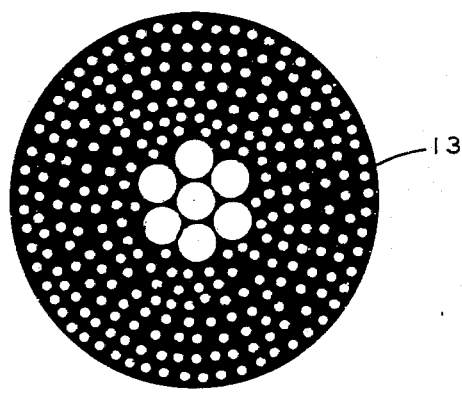
FIG. 2 is a transverse section on the line 2—2 of FIG. 1.

A fishing line embodying the present invention comprises a filamentous core surrounded by a flexible surface layer.

The core may consist of a single filament or a multiplicity of filaments, and it preferably has substantially greater tensile strength and substantially less elongation than the material of the surface layer. When the core contains more than one filament, the filaments may be braided, twisted or laid side by side. The core may consist of nylon, Dacron, silk or any other suitable filamentous material. When the core has substantially greater total tensile strength and substantially less elongation than the surface layer of the line, it is the core which determines the tensile strength of the line, as well as the degree to which the line will stretch or elongate, because under a tensile load the surface layer tends to elongate freely and thus permits the core to take the load. Under such circumstances, the elongation or stretchability of the line is substantially that of the core, and the tensile strength of the line is substantially equal to that of the core. In that way, the core prevents the line from being excessively "soft" under tension, so as to enable the fisherman to set the hook by a jerk on the line after a fish has taken the bait.

Although the core may determine the tensile strength and elongation of the line, the core alone, before the addition of the surface layer, is much more flexible than is desirable in a fishing line. The necessary stiffness is imparted to the present fishing line by the surface layer surrounding the core.

Ordinarily the core is a multi-filament core, which is substantially more flexible than a monofilament core.

Before the surface layer is applied to the core, it is desirable to coat the core with a primer which improves the adherence of the surface layer to the core and insures the formation of a good bond between the surface layer and the core.

The primer should be applied in the form of a relatively non-viscous liquid which flows freely so as to wet the core thoroughly. The primer may consist of a solution of any synthetic resin that is compatible with the plastisol which is to be applied as the surface layer. For example, the primer may consist of a solution of a copolymer of vinyl chloride and vinyl acetate in methyl isobutyl ketone. Another primer which may be employed is an acrylonitrile-butadiene copolymer solution in methyl ethyl ketone or methyl isobutyl ketone.

If desired, the primer solution may be applied while hot, in order to increase the solubility of the synthetic resin in the solvent employed. The primer may be applied to the core in a continuous operation, by passing the core continuously through a tank of the primer and then exposing the core to radiant heat or to circulated hot air in order to evaporate the solvent from the primer and to remove moisture from the core.

After the core has been coated with a primer and dried, the surface layer is applied to the core in the form of a plastisol. The polymer in the plastisol used in the practice of the invention consists essentially of polymerized vinyl chloride, but the vinyl chloride used to form the polymer may be copolymerized with small proportions of other monomers, e.g., with a proportion of vinyl acetate of about one half of one percent of the weight of the vinyl chloride used. For example, 96% of the vinyl chloride may be present in the form of a homopolymer, and the other 4% of the vinyl chloride may be present in the form of a copolymer obtained by the copolymerization of 4 parts of vinyl acetate with 35 parts of vinyl chloride, the copolymer being dissolved in the plasticizer in which the fine particles of the homopolymer are suspended to form the plastisol.

A polymer for use in the plastisol may be prepared by emulsion polymerization. Preferably the polymer is in the form of a powder having a particle size of the order of one micron, which may be mixed with one or more plasticizers to produce a plastisol.

The plasticizers which may be employed include all of the plasticizers which are useful in the production of flexible polyvinyl chloride products. These known plasticizers include di-octyladipate, di-2-ethylhexyl phthalate, dicapryl phthalate, tricresyl phosphate and trioctyl phosphate.

Minor proportions of resin-type plasticizers also may be added to increase the viscosity of the plastisol and to obtain the desired properties in the finished product.

The proportion of plasticizers in the plastisol depends upon the particular plasticizers and the particular polymer used, and may vary from about 30 to about 70 parts of plasticizers to 100 parts of polyvinyl chloride.

In accordance with usual practice, the plastisol should contain from about one to about four parts of a stabilizer for each 100 parts of polyvinyl chloride. The stabilizer may be a substance which combines with hydrogen chloride liberated from the polyvinyl chloride, such as a lead soap. Other stabilizers which may be employed include soaps of zinc and cadmium and expoxidized plasticizers.

Other modifiers, such as pigments or dyes, may be added in small proportions if desired, without affecting the quality of the final product.

In accordance with the invention, the plastisol consisting of the ingredients hereinbefore described is modified by incorporating microscopic glass beads in the plastisol. Since the improvement in properties such as stiffness and low surface friction increases with the proportion of glass bead in the plastisol, it is desirable in each case to use the maximum proportion of glass beads which can be employed without converting the plastisol from a liquid into a solid material. Smaller proportions can be used, although part of the improvement is thereby sacrificed.

The optimum proportion of glass beads can be determined in each case by gradually adding glass beads to a sample of the plastisol in order to ascertain the maximum proportion which can be employed without reducing the fluidity of the composition to a point that would interfere with the application of the composing to the core of the fishing line.

In general, the specific proportion of glass beads which can be incorporated without converting the plastisol from a liquid into a solid material depends upon the total surface area of the beads. Thus, when two samples of beads have the same glass composition but have a different average diameter, the proportion of beads of greater average diameter which can be incorporated is greater than the proportion of beads of smaller average diameter. If two samples of glass beads have the same diameter but are made of glass of different density, the weight of beads which can be incorporated is in proportion to the density, but the total volume of beads which can be used is identical in both cases because the beads in the two samples are of the same diameter.

The glass beads should be solid rather than hollow, and preferably are in the form of solid spheres. Glass microballoons cannot be used in place of the solid glass beads, because the proportion of glass microballoons which could be incorporated without reducing the weight of the line per unit of length below the minimum permissible value would not be sufficient to produce an appreciable improvement in the physical properties of the line. Glass microballoons also are undesirable because of their tendency to fracture.

When it is desired in the practice of the invention to produce a line of extremely light weight per unit of length, however, the incorporation of the maximum proportion of glass beads which can be used without converting the plastisol into a solid may cause the finished line to exceed the desired weight per unit of length. In that case, instead of making the relatively large reduction in the proportion of glass beads which would be necessary to bring the weight of the finished line down to the desired value, it is better to replace a relatively small proportion of the glass beads with glass microballoons Since the density of ordinary glass microballoons is only about 0.3, the incorporation of a small proportion of glass microballoons decreases the average density of the material, so as to make it possible to employ an increased proportion of microscopic glass beads without exceeding the desired average density.

Glass beads are available in a wide variety of diameters, but the glass beads employed in the practice of the present invention should be microscopic in size. The glass beads employed should be small enough so that at least half and preferably all of the glass beads will pass through a 200 mesh screen. Preferably, the glass beads are small enough so that all will pass through a 325 mesh screen. Although it is desirable to limit the maximum size of the glass beads by screening, it is not ordinarily necessary to screen out the fines. However, the presence of a substantial proportion of fines in the glass beads will prevent the attainment of optimum results, because the fines have a relatively large surface area and thus reduce the total amount of glass beads which can be incorporated without converting the plastisol from a liquid to a solid material.

The glass beads which are available commercially are of various compositions. The type of glass used depends upon the density desired. Beads of soda line glass have relatively low density, while beads of barium glass have intermediate density and beads of lead glass have maximum density. In each case, the ingredients from which the glass is made include silica as well as oxides of elements such as alkali metals, boron, barium and lead.

The microscopic glass beads which are to be used in the practice of the present invention are advantageously provided with a coating which is produced by contacting the glass beads with an aliphatic alkoxysilane. It is believed that traces of water present on the surface of the glass beads may enter into a reaction in which the aliphatic alkoxysilane is first hydrolyzed to a silanol which then condenses with hydroxy groups attached to silicon atoms at the surface of the glass beads, thus splitting off water and bonding the residue of each silanol molecule to the glass surface. The coating thus applied to the glass beads should be as thin as possible, preferably consisting of a monomolecular layer.

The coatings of glass beads preferably is performed by allowing glass beads to fall through a current of air which contains the aliphatic alkoxysilane vapor and which is at a temperature between 200 and 300° F. The coating operation can be carried out advantageously immediately after the glass beads have been formed and while they are still hot.

A large variety of aliphatic alkoxysilanes may be employed for the coating operation, including beta-(3, 4 epoxycyclohexyl) ethyltrimethoxysilane, gamma-aminopropyltriethoxysilane, gamma-glycidoxypropyltrimethoxysilane and bis (beta-hydroxyethyl) gamma-aminopropyltriethoxysilane.

In the practice of the present invention, it is possible to produce a variety of lines, each having a different weight per unit of length, but all having the same or substantially the same diameter, preferably 0.35 and 0.45 inch. A line of increased weight per unit of length is produced, without increasing the diameter of the line, by using microscopic glass spheres that are made of glass which have a relatively high density. In this way, the weight of the line per unit of length is increased without increasing the proportion by volume of glass spheres.

Although it is desirable to maintain the same small diameter of the line in all cases, it may be necessary occasionally to produce a line embodying the present invention which has an extremely high weight per unit of length that cannot be attained by merely using glass beads of high density. Even in such a case, however, it is not necessary to increase the diameter of the line in order to produce a line of the desired high weight per unit of length. In any such case, in which it is not possible to increase the weight of the line per unit of length to the desired value by employing glass beads of maximum density, in the maximum proportion which can be used without converting the plastisol to a solid, it is permissible to increase the weight of the line to the desired value by replacing part of the glass beads with particles of lead oxide, or with microscopic lead shot. The particle size which can be used in the case of the lead oxide or lead shot is the same as the particle size which can be used in the case of the glass beads.

If the particle size of the lead oxide or lead shot to be used in a particular composition is the same as the particle size of the glass beads employed, then a portion of the glass beads can be replaced by an equal volume of lead oxide or microscopic lead shot. This will increase the average density of the composition, because the density of the lead oxide or lead shot is substantially greater than that of the glass beads, even when the glass beads are made of high density glass. The proportion of lead oxide or lead shot to be employed is that proportion which is necessary to produce a line of the desired weight per unit of length.

If necessary, as much as ⅔ of the glass beads can be replaced by lead oxide or lead shot. The preferred form of lead oxide is litharge. However, the ordinary pigment grade is litharge is so fine as to limit the proportion which can be used in the present composition, so that the total proportion of a mixture of pigment grade litharge and microscopic glass beads which can be employed in the composition is less than the maximum proportion of glass beads which can be used without the litharge.

In the practice of the invention, the glass beads, with or without a lead oxide or microscopic lead shot, are mixed thoroughly with the plastisol consisting of a suspension of finely divided polyvinyl chloride in one or more plasticizers as hereinbefore described. The fishing line may then be produced by passing the core, which has been coated previously with a primer, through a tank containing a plastisol in which the ingredients hereinbefore described have been incorporated. The core carrying the layer of plastisol composition may then be passed through an apparatus of the type shown in U.S. Patent No. 2,862,282. In the operation of that apparatus, the core, which becomes coated with a relatively thick layer of the plastisol, is drawn vertically out of the plastisol, and passes through an opening formed at the line of contact of two rollers which have circumferential grooves that register to form a passage between the two rollers at the line of contact. In that apparatus, the size of the opening or passage between the rollers at the line of contact may be varied gradually as the operation proceeds. The diameter of the finished product is determined by the diameter of the opening through which the coated core is drawn between the rollers. In order to produce a tapered fly fishing line embodying the invention, the diameter of the opening between the rollers is varied gradually as the coated core passes between the rollers, thus varying the thickness of the layer of plastisol surrounding the core so as to provide the desired taper.

Preferably the diameter of the core itself is uniform throughout the length of the line.

A line which has been prepared by the procedure hereinbefore described is in its final form, except that the surface layer consists of a relatively soft plastisol. In order to harden the surface layer, the line is then heated to a temperature between 350 and 380° C., preferably by passing the coated core continuously through an oven in which it is subjected to radiant heat.

During this heating operation, the polyvinyl chloride is fused so as to convert the plastisol to a solution of the polyvinyl chloride in the plasticizers. The length of time during which the line is held at a temperature between 350 and 380° C. may vary from ½ to 10 minutes, depending upon the exact temperature used.

The drawing shows a finished product embodying the invention, in which a braided core 11 composed of a multiplicity of filaments is coated with a thin layer of a primer 12 which forms the boundary between the core 11 and the surface layer 13. As shown in the drawing, microscopic glass beads are dispersed throughout the surface layer 13.

A typical core 11 consists of braided nylon and has a diameter of 0.25 inch and a total breaking strength of 15 pounds. If a line of higher tensile strength is desired, a core having a total breaking strength of 20 or 25 pounds may be used.

In a fishing line embodying the invention, the core is surrounded by a flexible surface layer, and the maximum diameter of the finished line preferably is from about 0.35 to about 0.45 inch. In a typical fishing line, used for casting, the middle portion of the line is of uniform diameter over a length of about 66 to 74 feet, and the line tapers gradually at each end for a distance of 8 to 12 feet, to a minimum diameter of about .030 inch, and terminates in an untapered tip portion which is of that diameter and is about two feet long.

Fly fishing lines must be of different weights in order to give satisfactory casting action with different rods. The critical part of a fly fishing line is the working part of the line, which is the front part of the line that is attached to the fly. In accordance with the AFTMA Fly Line Standards, the lines are graded in accordance with the front 30 feet of the line, excluding any untapered tip portion at the end of a tapered portion, such as the two feet of tip portion hereinbefore mentioned. Thus a standard No. 1 fly line is a line in which the front 30 feet of the line weights 60 grains. The weights of the standard fly lines increase by increments of 20 grains, up to a No. 6 line, in which the front 30 feet of the line weighs 160 grains. The standard weight for a No. 7 line is 185 grains; for a number 8 line is 210 grains; for a number 9 line is 240 grains; and for a number 10 line is 280 grains. Extremely heavy lines include number 11, at 330 grains and number 12, at 380 grains. A variation of plus or minus 6 grains is permissible in grades 1 through 5; a variation of plus or minus 8 grains in grades 6, 7 and 8; a variation of plus or minus 10 grains in grades 9 and 10; and a variation of plus or minus 12 grains in grades 11 and 12.

Fly lines are also classified as floating, sinking or intermediate, the floating lines being of the lowest density.

Heretofore, lines of different weight have been produced by manufacturing the lines in different diameters. The necessity of producing a line of relatively large diameter in order to provide a relatively high weight per unit of length has entailed important disadvantages as hereinbefore described. Also, in the case of the known lines consisting of a filamentous core surrounded by a layer of plasticized polyvinyl chloride, the floating types of lines have been reduced in density by making them cellular, for example by incorporating glass microballoons in the flexible surface layer. These cellular lines have been made even larger in diameter than the non-cellular lines, in order to maintain the desired weight per unit of length.

The present invention makes it possible to produce a whole series of lines, each of which is of different weight per unit of length, but all of which are of the same relatively small diameter. It has been found that the microscopic glass beads enhance the stiffness of the present line, so that the line is not excessively flexible even with a relatively small diameter.

In the production of a line of the present invention, the desired weight per unit of length is achieved by using microscopic glass beads of the proper density.

A line embodying the present invention will float if it is coated with a conventional water-repellent dressing. The relatively small diameter of the present lines enhances their ability to float when covered with a water-repellent dressing, and also reduces the amount of water that they carry when picked off the surface of the water in preparation for a new cast. The small size of the present lines reduces wind resistance during casting, and also reduces the surface friction as the line runs through the guides of a pole. Also, it has been found that the presence of the microscopic glass beads in the present lines produces a further substantial reduction in the surface friction.

A typical plastisol which may be used in the practice of the present invention has the following composition in parts by weight:

| | Parts |
|---|---|
| Polyvinyl chloride (Geon 121) | 100 |
| Dioctyl adipate | 53 |
| Expoxidized tall oil (Flexol EP8) | 10 |
| Lead soap | 3 |

One hundred parts by weight of this plastisol may be mixed with 40 parts of glass spheres having a density of 2.54, which are made of a barium glass and which are small enough to pass through a 325 mesh screen, together with 5 parts by weight of glass microballoons having an average diameter of about 100 microns. The wall thickness of the microballoons is of the order of 1% of the diameter, and the average density is about 0.3 gram per cubic centimeter.

The resulting composition, when intimately mixed, may be applied to a core which has been coated with a primer and may then be heat treated, as hereinbefore described, to produce a line of number 4 weight which has a diameter of .040 inch.

In order to produce a line of greater weight per unit of length, the composition above described may be modified by replacing part of the glass microballoons with an additional quantity of the microscopic glass beads. The microballoons, because of their low density, have approximately 8 times the surface area of an equal weight of the glass beads. Thus in modifying the composition, a given weight of microballoons is replaced by approximately 8 times the weight of glass beads. When all of the microballoons in the composition are replaced by the glass beads, the material contains 80 parts of the glass beads for 100 parts of the plastisol, and the line produced from the composition is of number 7 weight. In each case, the proportion of microscopic glass beads, or the proportions of glass beads and glass microballoons, preferably are the maximum which can be used without converting the plastisol from a liquid to a solid material.

Another composition may be prepared by mixing 100 parts by weight of the above plastisol with 190 parts of heavy glass beads which have a specific gravity of 4.49 and which are small enough to pass through a 200 mesh screen. When intimately mixed, the resulting composition may be applied in the manner hereinbefore described to a braided nylon core which has been coated with a primer, to produce a line of the present invention which has a diameter of .044 inch and is of number 10 weight, with a specific gravity of 1.85. In contrast, a typical sinking line of the type heretofore known has a specific gravity of only 1.24 and has a diameter of .064 inch.

Lines of weights between number 7 and number 10 may be produced by employing the two types of glass beads hereinbefore described in combination. Because of the relatively small area per unit of weight of the heavier glass beads, 19 parts by weight of the heavier glass beads can be used to replace 8 parts of the lighter glass beads.

Because of the excellent casting properties of the lines embodying the present invention, a range of weights from number 4 to number 10 is adequate for all practical purposes, and there is no practical need for a line embodying the invention having a weight less than number 4 or greater than number 10.

A line embodying the present invention of number 4 or number 5 weight, when coated with a conventional water-repellent dressing, gives excellent results as a floating line.

In order to demonstrate the advantages which are possessed by a sinking line embodying the present invention because of its relatively small diameter, an experiment was performed in which two fishing lines were stretched side by side above a swimming pool and then were released simultaneously to allow them to sink in the pool. One of the two lines was a commercial sinking line of the type heretofore known, of number 9 weight. The other line was a line embodying the present invention, which was a number 9 line the weight of which per unit of length was identical with that of the first line. The diameter of the line embodying the present invention was .044 inch, while the diameter of the commercial sinking line was .060 inch. In this experiment it was found that the commercial sinking line, because of its larger diameter, took approximately three times as long to sink to the bottom of the swimming pool as the line of the present invention.

Fishing lines embodying the present invention are advantageously supplied as a package of lines which are of substantially the same diameter, but in which the average density of the glass beads differs from line to line, so that the weight per unit of length also differs from line to line.

We claim:
1. A fishing line comprising a filamentous core surrounded by a flexible surface layer of plasticized polyvinyl chloride, wherein the improvement comprises microscopic glass beads dispersed throughout the surface layer to improve the physical properties and increase the specific gravity of the line.

2. A fishing line according to claim 1 wherein the glass beads are in the form of solid spheres.

3. A fishing line according to claim 1 wherein the maximum diameter of the line is from 0.35 to 0.45 inch and the weight of the first 30 feet of the line, excluding any untapered tip portion at the end of a tapered portion, is from 177 to 290 grains.

4. A package of fishing lines of assorted weights, each of which is a fishing line according to claim 1, all of the lines being of substantially the same diameter, from 0.35 to 0.45 inch, and the average density of the glass beads, differing from line to line, so that the weight per unit of length also differs from line to line.

5. A method of making a fishing line by applying to a filamentous core a surface layer of a polyvinyl chloride plastisol wherein the improvement comprises the step of intimately incorporating in the plastisol microscopic glass beads in a proportion sufficient to improve the physical properties of the finished product without converting the plastisol to a solid.

6. A method according to claim 5 of making a series of fishing lines of substantially the same diameter but of different weight per unit of length, wherein microscopic glass beads of different average density are incorporated in making each line of different weight per unit of length.

References Cited

UNITED STATES PATENTS

| 1,908,278 | 5/1933 | Angell | 242—137.1 |
| 2,237,412 | 4/1941 | Carothers | 43—54.5 |
| 2,834,144 | 5/1958 | Jones | 43—54.5 |
| 3,334,436 | 8/1967 | Cole | 43—44.98 |

FOREIGN PATENTS 914,216  12/1962  Great Britain.

SAMUEL KOREN, Primary Examiner

D. J. LEACH, Assistant Examiner

U.S. Cl. X.R.

43—54.5; 117—161; 161—175; 206—46